Apr. 17, 1923.
F. R. FAGEOL
1,452,369
AUTOMOBILE BODY
Filed Feb. 16, 1922
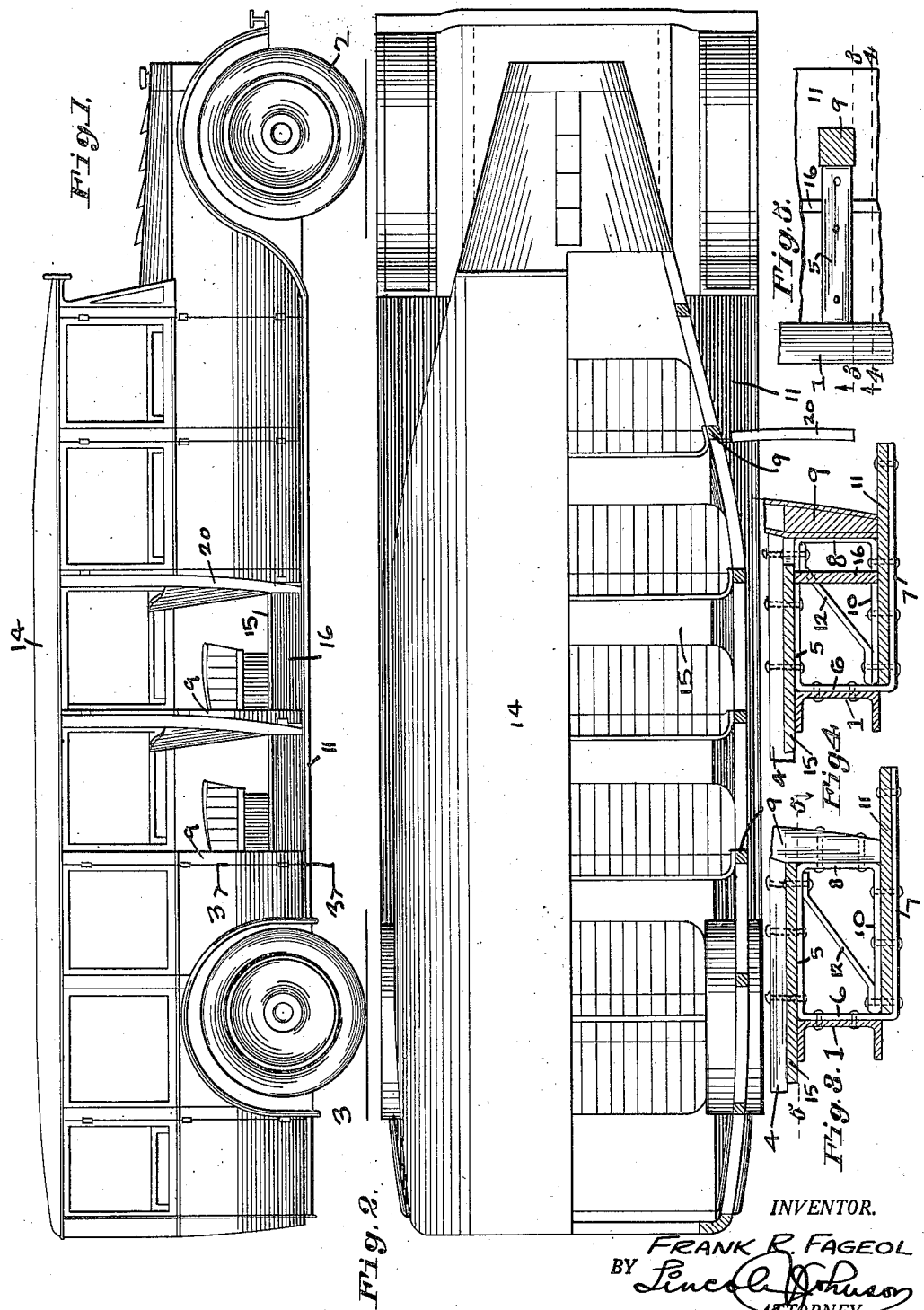
INVENTOR.
FRANK R. FAGEOL
BY
ATTORNEY Patented Apr. 17, 1923.

1,452,369

UNITED STATES PATENT OFFICE.

FRANK R. FAGEOL, OF OAKLAND, CALIFORNIA.

AUTOMOBILE BODY.

Application filed February 16, 1922. Serial No. 536,867.

*To all whom it may concern:*

Be it known that I, FRANK R. FAGEOL, a citizen of the United States, and a resident of the city of Oakland, county of Alameda, State of California, have made a new and useful invention—to wit, Improvements in Automobile Bodies; and I do hereby declare the following to be a full, clear, concise, and exact description of the same.

This invention relates more particularly to an automobile body adapted for use on passenger carrying buses, stages and the like.

An object of this invention is to provide an automobile body particularly adapted to furnish commodious accommodation for passengers and to allow quick and easy access by the passengers into the interior of the body from the traction surface.

A further object of the invention is to provide an automobile body of the bus type that will be superior in point of simplicity and design, and inexpensiveness of construction, positiveness of operation, facility and convenience in use and general efficiency.

A still further object of the invention relates to the new and novel type of connection between transverse stiffeners on the flooring of the body and to substantially vertically positioned side columns, the running board and the chassis frame.

Other objects and advantages will appear as this description progresses.

In this specification and the annexed drawings, the invention is illustrated in the form considered to be the best, but it is to be understood that the invertion is not limited to such form, because it may be embodied in other forms; and it is also to be understood that in and by the claims following the description, it is desired to cover the invention in whatsoever form it may be embodied.

In the accompanying one sheet of drawings:

Fig. 1 represents a side elevation of an automobile body constructed in accordance with my invention.

Fig. 2 represents a plan vertical of Fig. 1, partly broken away to show the interior construction thereof.

Fig. 3 represents an enlarged cross section taken on the line 3—3 of Fig. 5 and of Fig. 1.

Fig. 4 represents a similar cross section taken on the line 4—4 of Fig. 5.

Fig. 5 represents a plan section taken on the line 5—5 of Fig. 3.

Present day economic development has found a greater and more varied use for automotive vehicles than the standard and conventional types of automobile bodies are designed to take care of. In "jitney," bus or stage vehicles, a greater number of passengers can be transported with a cost slightly more than that incurred for transporting a smaller number of passengers in a large stock type automotive vehicle. The initial development along this line has been the production of crude and makeshift bodies applied either to enlarged or extended standard touring car chassis or the addition of a stage or passenger body to a truck chassis. In either case, the ultimate result has been inefficient for the reason that touring car chassis is not designed to stand up under the strains and stresses imposed where the same is converted into a bus, while on the other hand, a truck chassis converted into a bus does not have the necessary flexibility and speed commensurate to the producing of satisfactory results. Furthermore, trucks or standard types of touring cars converted into stages or buses are so faultily designed that passengers cannot gain access to or depart from the said vehicle without the aid of either a stepladder or a special contrivance, which may be lowered to make the ascent or descent easily negotiated.

It is the object of my invention to provide a chassis 1, comprised of parallel channel frame members having the conventional spring connection to front and rear axles or frames, on the outer ends of which the traction wheels 2 and 3 are mounted. The frame is "underslung" intermediate the traction wheels and at a point adjacent the rear traction wheel, the frame channel members are suitably trussed to pass around the rear axle housing so as to connect the "underslung" frame parts. It will be obvious that by providing an "underslung" frame, the flooring of the body mounted on the said frame will be closer to the ground than in vehicles of the stock type. The "underslung" design, furthermore, lowers the center of gravity of the vehicle closer to the traction surface and minimizes the danger of the vehicle tipping. The "underslung" construction does not allow the same clearance between the traction surface and the chassis as is provided in conventional chassis designs, however, such difficulties as might be encountered in this respect by the vehicle getting into the standard gauge tread ruts is eliminated by increasing the tread greater than the standard gauge. Construction of paved highways likewise will have a reasonable tendency to allow the widening of the tread gauge of automotive vehicles carrying loads in excess of that usually carried by the larger type of stock vehicles.

The body adapted to be mounted on the chassis consists of a plurality of transverse stiffeners or beams 4 arranged at spaced intervals across the frame members throughout the entire length thereof. The transverse beams 4 are adapted to overhang the sides of the channel frames 1 so as to provide a foundation for the superstructure of the body. A bracket member, formed of a continuous piece of flat bar, is adapted to be secured at 5 to the underside of the overhanging beams 4 by suitable carriage bolts or the like utilized for joining the said bracket and beam together at 4. One portion of the bracket is bended at 6 so as to lie substantially at right angles to the beam member, whereby the portion 6 may be riveted or otherwise suitably secured to the chassis channel members, and the end 7 of said bracket member is rebended at right angles so as to lie substantially at right angles to the chassis frame and substantially parallel with the floor beams 4 to form a running board support. The opposite portion of the bracket 5 is bended at 8, substantially at right angles to the floor beams 4, to provide a substantially vertical surface to which the lower end of side pillars or columns 9 may be secured, the adjacent portion 10 of said flat bar being again rebended at right angles so as to lie substantially parallel with and spaced from the end 7, whereby the continuous running board 11 may be inserted between the members 7 and 10 and rigidly secured thereto in any conventional manner. The opposite end 12 of the flat bar is bended so as to lie diagonally within the substantially rectangular structure formed by the portions 5, 6, 10 and 8 and to act as a stiffener or reinforcement against distortion of the said shaped flat bar.

Columns or pillars 9 are arranged adjacent each of the opposite ends of the floor beams 4 and extend vertically a distance sufficient to allow head room clearance for passengers seated within the said body. The floor beams 4 and side columns 9 are formed from wood or any other light material and as the respective parts are joined, forms a stiff and rigid structure capable of withstanding equally as great strains or stresses, as if formed from metal.

A suitable top 14 is adapted to rest upon the upper ends of the side columns 9 and to be rigidly secured thereto. Suitable transverse and longitudinal members are provided in the top 14, connecting the side columns to prevent any lateral or longitudinal twisting. The space between the beam members 4 over the chassis is enclosed by suitable interlocking tongue and groove flooring 15, suitably joined together and to the reinforcing bracket structure in any desirable manner. The floor 15 overhangs the chassis frame a slight distance and a longitudinally extending filler member 16 is interposed between the outer edge of the flooring and the running board 11, for the twofold purpose of supporting the projecting ends of the flooring and presenting a smooth and finished exterior appearance to the side of the vehicle body. The filler 16 is not continuous for its full length but is cut away at the points that it intersects the flat metal brackets.

The running board 11 is placed beneath the floor of the body so as to divide the space between the traction surface and the flooring into approximately equal distances. Thus, the height of the running board 11 from the traction surface would vary from eight (8) to thirteen (13) inches while the distance from the running board to the flooring would vary from five (5) to ten (10) inches. These heights are in accord with the rises that the average person is used to in stepping up, making it convenient and easy for a passenger to step into or out of the body.

The openings between the spaced pillars or columns 9 are enclosed by suitably hinged doors 20 or the like, with drop windows so as to permit of good ventilation and incidentally of a clear vision, when the windows are raised to exclude inclement weather. The hinged doors are adapted to extend between the edges of top 14 and the upper face of the running board 11, thus enclosing the filler and flooring of the body from outward view. The feature of having the doors opening on the running board is very valuable in that a passenger can open the door from the traction surface and by a very slight upward step can be seated within the body. The construction of the body furthermore is made more exact and practical as contrasted with constructions of a similar nature.

In an instance where the body is designed as a stage or bus for carrying a number of passengers a row of transverse upholstered seats and backs would be arranged within the body substantially opposite the space between the side columns. The doors opening opposite of a row of seats will thus allow access to that particular row without causing any disturbance or annoyance to the passengers in the other seats. Experiments made with bodies of this character likewise permit of a construction with doors only at the opposite ends of each of the sides of the body, the intervening portion between the doors being a solid structure. The interior of the car may be provided with individual, movable chairs or rows of seats that could be arranged or placed in any part of the body according to the desires of the occupant. Such an arrangement is very adaptable to a bus utilized for sight-seeing purposes, whether privately or publicly conducted.

Having thus described this invention, what I claim and desire to secure by Letters Patent is:

1. In combination with an automobile chassis having a body thereon, of a running board secured to said body and chassis beneath the plane of the body floor and extending substantially the full length of said body and doors on said body opening out from said running board.

2. In combination with an automobile chassis having a body thereon, of a running board secured to said body and chassis; side columns secured at the bottoms to said body and resting on the running board and having a top on the opposite ends thereof and a door interposed between said side columns, top and running board.

3. In combination with an automobile frame having a body thereon, of a running board secured along both sides of said body and frame beneath the upper plane of said frame; side pillars secured at the bottoms to said body and resting on the running board and to a body enclosing top at the opposite ends and doors interposed between said side pillars, top and running board.

4. In combination with an automobile frame, of a body having running boards thereon, adapted to be mounted on said frame, the floor of said body projecting beyond both sides of said frame and brackets adapted to be secured to the projecting part of said body floor and to said frame, said brackets having means thereon engageable with top supporting pillars and for supporting the running board beneath the plane of said body floor.

5. In combination with an automobile frame, of a body having running boards thereon, adapted to be mounted on said frame, the floor of said body projecting beyond both sides of said frame; a bracket adapted to rigidly connect the projecting parts of the body floor to said frame, said bracket being formed to engage pillars for supporting the body top and to support the running board beneath the plane of said body floor and doors adapted to be interposed between said pillars, top and running board.

6. A device of the character described comprising an automobile frame; members adapted to be mounted transversely on said frame and to have the ends thereof project beyond said frame; brackets adapted to rigidly connect said frames to the projecting ends of said members; side pillars secured at the lower ends thereof to said transverse members and to said brackets; a running board mounted on said brackets beneath the plane of said frame members and abutting the bottoms of said side pillars and doors interposed between said side pillars, adapted to approximately contact with said running board.

In testimony whereof, I have hereunto set my hand at San Francisco, California, this 17th day of January 1922.

FRANK R. FAGEOL.

In presence of—
LINCOLN V. JOHNSON.